Dec. 15, 1936.  F. W. GRIES  2,063,923
CLAMPING DEVICE FOR SWITCH BOXES AND OTHER FIXTURES
Filed March 27, 1935
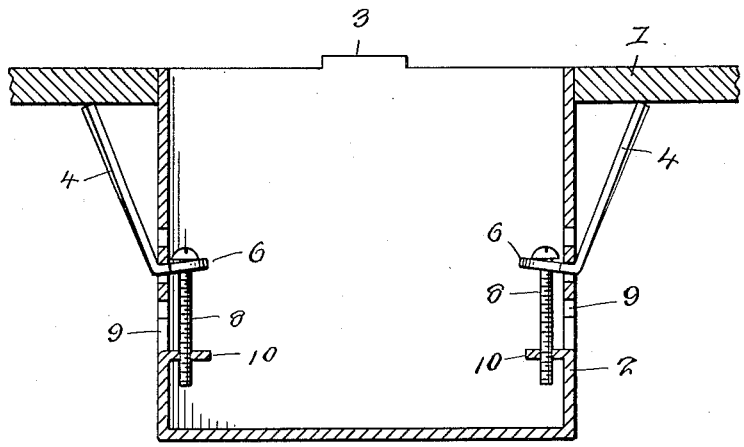
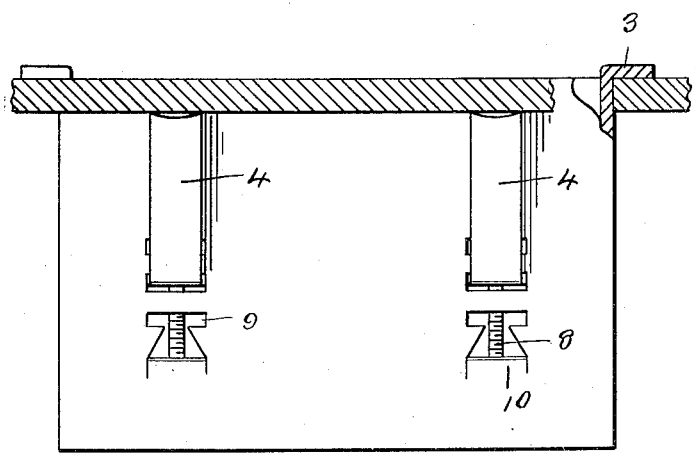
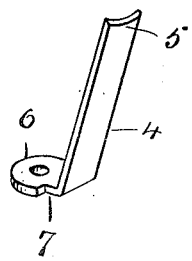
F. W. Gries
INVENTOR
BY Victor J. Evans & Co.
ATTORNEY Patented Dec. 15, 1936

2,063,923

UNITED STATES PATENT OFFICE 2,063,923

CLAMPING DEVICE FOR SWITCH BOXES AND OTHER FIXTURES

Fred W. Gries, Averill Park, N. Y.

Application March 27, 1935, Serial No. 13,363

2 Claims. (Cl. 247—21)

This invention relates to clamping devices for switch boxes and other fixtures and has for the primary object the provision of a device of this character which will firmly secure or anchor a box or like device to a wall or similar structure and is readily adjustable so as to be adaptable to walls of different thicknesses and is easy and quick to install and remove from a wall and which will be inexpensive to manufacture so that the device may be sold at a low cost.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a longitudinal sectional view showing the securing of a box or like device to a wall or similar support by clamping devices constructed in accordance with the present invention.

Figure 2 is a plan view, partly in section, showing the clamping devices.

Figure 3 is a perspective view showing one of the clamping devices.

Referring in detail to the drawing, the numeral 1 indicates a wall or like support apertured to receive a switch box or similar fixture 2, the latter having the usual wall engaging elements 3 that abut one face of the wall. The opposite face of the wall is engaged by elements 4, the latter being adjustably secured to the box. The wall engaging ends of the elements 4 are arcuately curved to form pointed portions 5 adapted to bite into the wall 1. The opposite ends of the elements 4 are enlarged and disposed at right angles to said elements 4 to form shouldered heads 6 having shank portions 7. The heads 6 are apertured to receive bolts or like fasteners 8. The walls of the box are provided with spaced slots 9. The slots are of such a size to permit the elements 4 to be passed therethrough from the inside of the box but which will permit the passing of the heads therethrough. The shanks 7 fulcrum against walls of the slots with the elements 4 diverging from the box and contacting the wall 1. On the inside of the box are arranged ears 10 having screw threaded openings to receive the bolts or like fasteners 8. The ears 10 are struck from the walls of the box adjacent to the groups of slots 9. The threading of the bolts to the apertures 10 cause the shanks to fulcrum on walls of the slots, forcing the ends 5 of the elements 4 and the wall engaging elements 3 of the box to tightly grip opposite faces of the wall 1 and thereby efficiently secure the box to the wall. It will be seen that the entire securing operation of the box to the wall 1 can take place from the inside of the box and further it is to be noted that the slots of each group permit adjustment of each element 4 to the box. Any number of elements 4 may be employed in connection with the box for securing the latter to the wall. However, it has been found that the box may be effectively secured in position by employing a pair of elements 4 each positioned or connected with an opposite wall of the box.

Having described the invention, I claim:

1. In combination with an outlet box having slots in opposite walls thereof and means to engage one face of a wall of a structure, elongated elements contacting the opposite face of the wall of the structure from said means and bent angularly to extend through the slots and provide attaching heads, and means for adjustably securing said heads to the box.

2. In combination with an outlet box having slots in opposite walls thereof and means to engage one face of a wall of a structure, elongated elements contacting the opposite face of the wall of the structure from said means and bent angularly to extend through the slots and provide attaching heads, threaded fasteners journaled to the heads, and means formed on the box and having the fasteners threaded thereto.

FRED W. GRIES.